Feb. 22, 1955 V. H. ROTHROCK 2,702,570
LOADING AND UNLOADING MECHANISM FOR DEBARKING MACHINES
Filed April 1, 1954 4 Sheets-Sheet 1
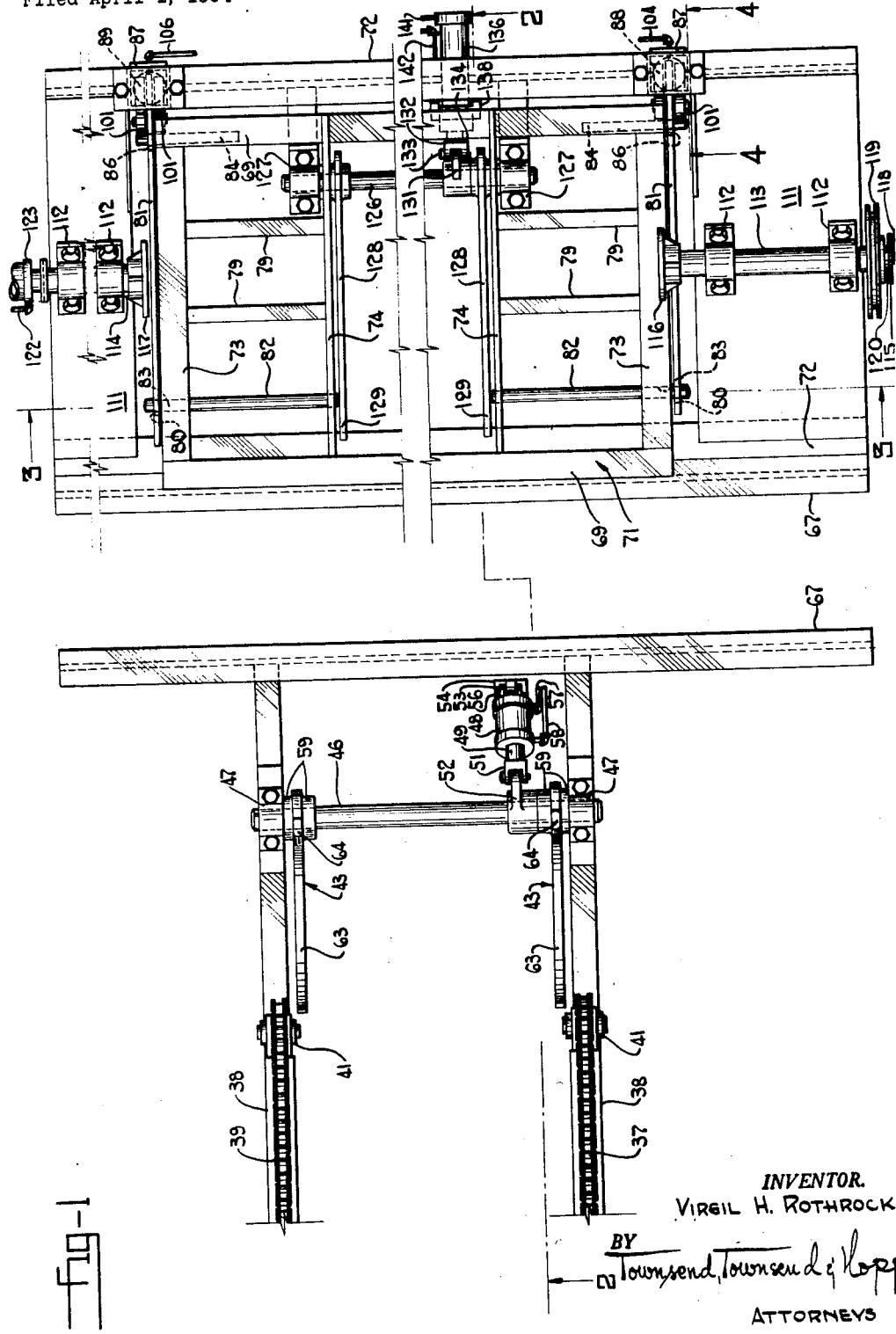
INVENTOR.
VIRGIL H. ROTHROCK
BY Townsend, Townsend & Koppe
ATTORNEYS Feb. 22, 1955   V. H. ROTHROCK   2,702,570
LOADING AND UNLOADING MECHANISM FOR DEBARKING MACHINES
Filed April 1, 1954   4 Sheets-Sheet 2
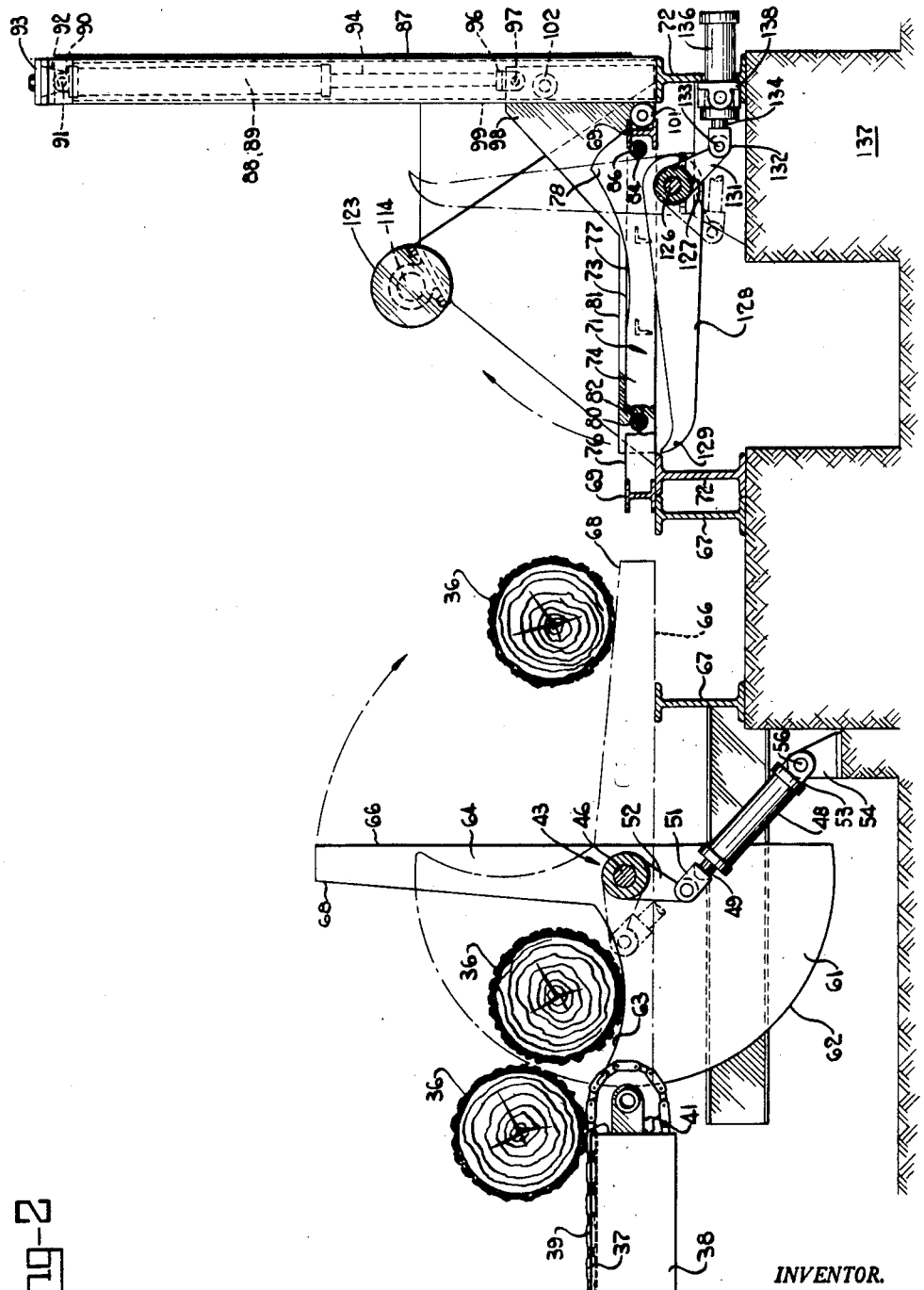
INVENTOR.
Virgil H. Rothrock
BY
Townsend, Townsend & Koppe
ATTORNEYS Feb. 22, 1955  V. H. ROTHROCK  2,702,570
LOADING AND UNLOADING MECHANISM FOR DEBARKING MACHINES
Filed April 1, 1954  4 Sheets-Sheet 3
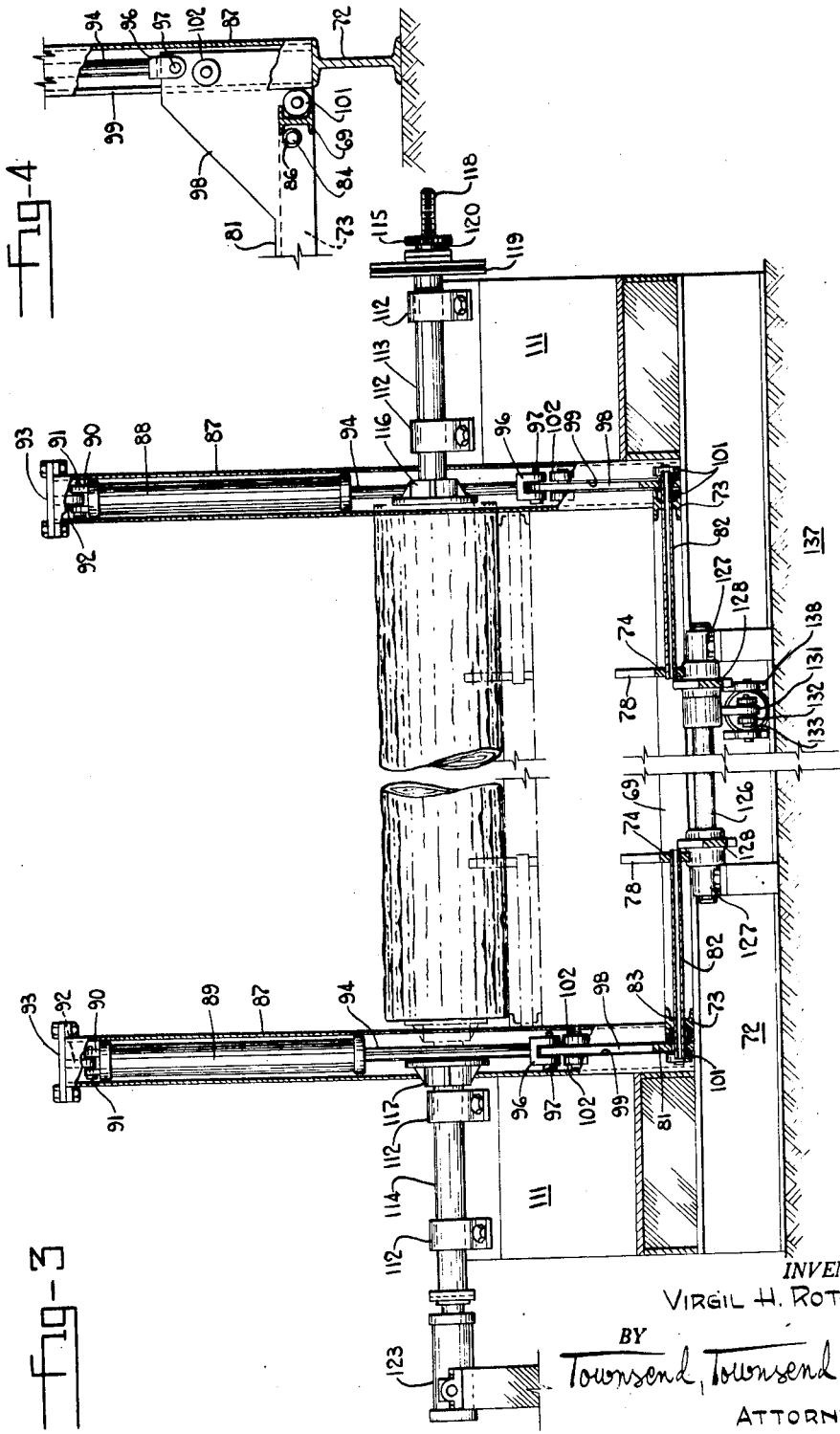
INVENTOR.
VIRGIL H. ROTHROCK
BY Townsend, Townsend & Koppe
ATTORNEYS

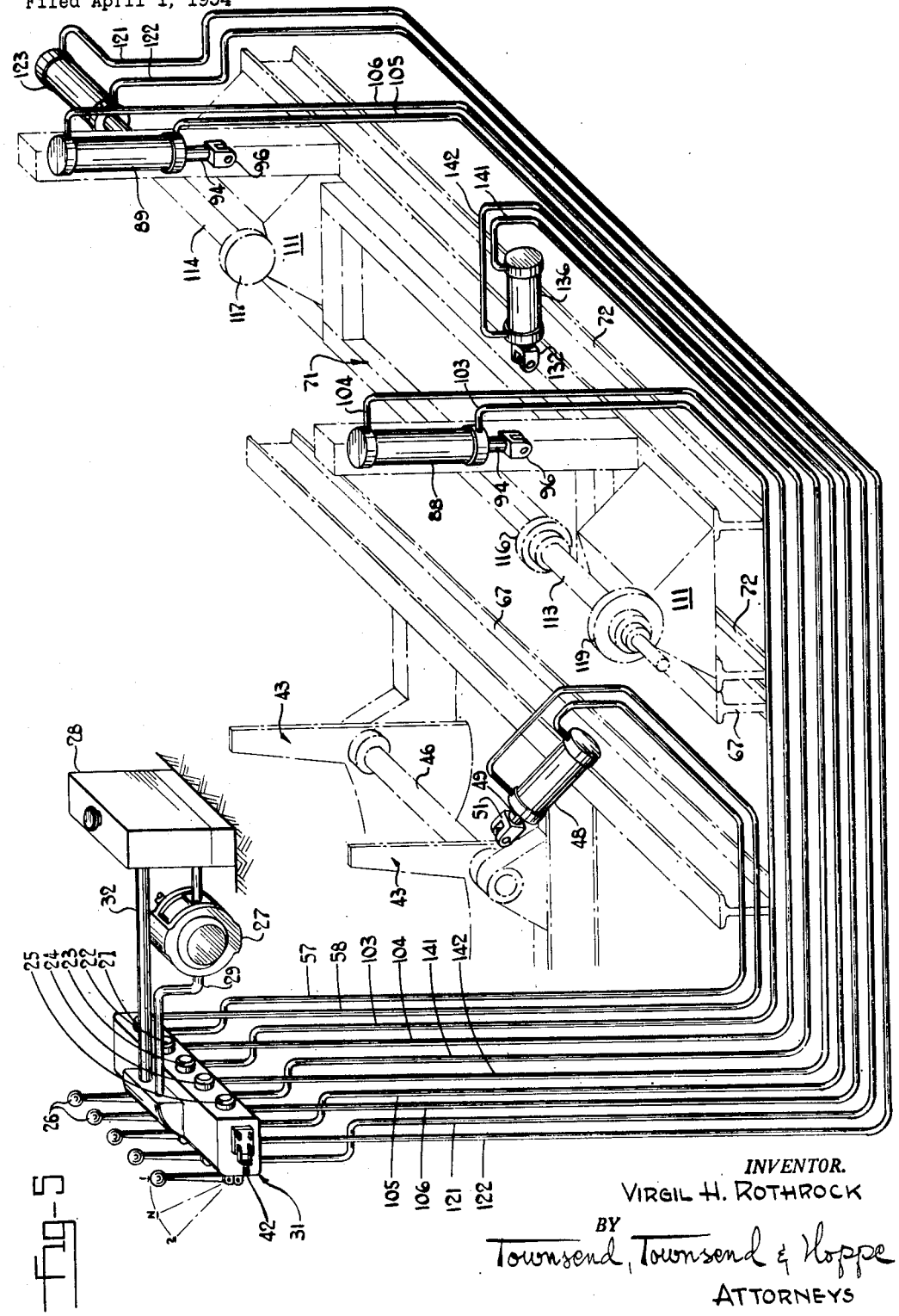

United States Patent Office 2,702,570
Patented Feb. 22, 1955

2,702,570

LOADING AND UNLOADING MECHANISM FOR DEBARKING MACHINES

Virgil H. Rothrock, Leggett, Calif., assignor to The Pacific Coast Company, San Francisco, Calif., a corporation of New Jersey Application April 1, 1954, Serial No. 420,312

20 Claims. (Cl. 144—242)

This invention relates to a new and improved loading and unloading mechanism for debarking machines.

The present invention finds application in the plywood manufacturing industry. Logs to be converted into plywood are first cut to proper length (termed "peeler blocks") and thereafter the bark is removed in a debarking machine. The means whereby the bark is removed forms no part of this invention, but it may be stated that a tool is brought against the peeler block and the bark stripped from the wood. The present invention relates to apparatus for transferring the peeler block from the saw which cuts it to length to the debarking equipment and thence discharging the block.

The principal object of the invention is a saving in the amount of labor required to load and unload the debarking machine. In accordance with the present invention a single operator can perform all of the manual operations required, thereby considerably reducing the cost of operation.

Still another object of the invention is the reduction in the manual labor required in that the movement of the peeler block is accomplished by hydraulic and electrical means.

Another feature of the invention is the fact that the apparatus is adjustable for a wide variety of diameters of peeler blocks and lengths thereof.

Still another feature of the invention is the fact that when the block is unloaded after debarking, the cradle which supports the log tilts to permit the block to slide out of engagement with the chuck which turns the block during debarking. The fact that the block slides out of contact with the chuck prevents the chuck from scoring or ripping the edge of the peeler block and thus increases the amount of useful material which may be obtained from a given block. The means whereby the tilting of the cradle is accomplished is hereinafter set forth in detail.

Other objects of the present invention will become apparent upon reading the following specification and referring to the accompanying drawings in which similar characters of reference represent corresponding parts in each of the several views.

In the drawings:

Fig. 1 is a top plan of the device, certain portions thereof being compressed to facilitate understanding of the invention.

Fig. 2 is a longitudinal vertical section taken substantially along the line 2—2 of Fig. 1.

Fig. 3 is a transverse vertical section taken substantially along the line 3—3 of Fig. 1.

Fig. 4 is a fragmentary section taken substantially along the line 4—4 of Fig. 1.

Fig. 5 is a schematic perspective view emphasizing the hydraulic system employed.

To facilitate description of the apparatus which is the subject of this invention, the following written description will be divided into sections representing different portions of the machine, it being understood that the various portions form an integral whole and that the parts of one portion overlap and closely inter-relate with the parts of adjacent portions.

The portions or stations of the machine are as follows:
(a) Hydraulic valve station which contains the valves and associated equipment which operate the hydraulic system.
(b) Transfer mechanism which transfers the peeler block from the saw to the loading arms.
(c) Loading arms which pivot through a 90° travel and move the peeler blocks from the transfer mechanism onto the cradle.
(d) Cradle and elevating mechanism which receives and locates the peeler block in proper position for engagement with the block revolving mechanism.
(e) Block revolving mechanism which chucks the peeler block and turns the same while the debarking tool performs its work.
(f) Discharge mechanism which discharges the peeler block from the cradle after the debarking operation has been completed.

The foregoing stations or portions of the machine will now be described in order.

Hydraulic valve station

The machine hereinafter described employs at least five hydraulic cylinders, the location and function of which are hereinafter described in greater detail. Inasmuch as the present machine is adaptable to one-man operation, the hydraulic valves which control the cylinders are located adjacent one another so that the operator need not move from one position. Accordingly, five valves 21 to 25 inclusive are mounted side by side in a bank. Operating levers 26 which actuate the valves are adjustable to three positions. The central position of lever 26 is a neutral position whereby the hydraulic fluid flows through the valve without being diverted to the hydraulic cylinders. The other two valve positions direct the hydraulic fluid to opposite ends of the cylinders so as positively to move the hydraulic piston within the cylinder in opposite directions. The fluid is pumped by means of a hydraulic pump 27 from a storage tank 28 to a valve block 31 by a conduit 29. The returning fluid is returned via a conduit 32 to the storage tank 28. From each of the various valves a pair of hydraulic fluid lines extends to the cylinder which is controlled by the particular valve, one line of the pair being connected to one end of the cylinder and the other line to the opposite end of the cylinder.

Transfer mechanism

As has been stated, the logs which are used in the manufacture of plywood are first cut to length by means of a saw on a deck (not shown). From this deck the peeler blocks 36 are moved onto a pair of spaced chains 37, the upper stretches of which are substantially horizontal and on which the peeler blocks rest. The chains are mounted within channels 38 having slots 39 at the top through which the chains project. The channels 38 prevent the chains from becoming entangled with extraneous objects or causing injury. The chains 37 pass around sprockets 41 at the discharge end and there are additional sprockets (not shown) at the opposite end turned by an electric motor (not shown). The electric motor is controlled by a jog switch 42 at the operator's station which moves the successive log blocks up to the end of the chains 37 in position for transfer to loading arms 43. The loading arms are at a slightly lower elevation than the top stretch of the conveyor chains and hence the logs roll by gravity off the end of the chains and onto the arms.

Loading arms

The pair of spaced loading arms 43 is provided to receive the peeler logs rolling off the end of the conveyor chains 37. Each of the loading arms is keyed to a rotatable shaft 46 mounted in pillow blocks 47 so that the two arms rotate together. Rotation of the shaft 46 is accomplished through a first hydraulic cylinder 48, the outer end of a piston rod 49 of which is formed as a clevis 51 which is connected to an arm 52 keyed to the shaft 46. The opposite end of the first cylinder 48 is also formed as a clevis 53 which is fastened to a stationary hanger 54 by a pin 56. Hydraulic fluid lines 57 and 58 connect opposite ends of the cylinder 48 to opposite ports of the first valve 21. By means of the valve 21, the piston rod 49 may be projected or retracted in the cylinder 48 and this movement produces a 90° turning movement of the shaft 46 and of the loading arms 43.

Each loading arm 43 is of identical shape and is formed of steel plate to provide the required strength and rigidity. A hub 59 is formed on each side of the loading arm for reception of the shaft 46. One quadrant 61 of each loading arm has a substantially arcuate perimeter 62 of approximately 90°. One edge 63 of the aforementioned quadrant is formed inwardly curved so that the block 36 rolls from the loading chains 37 onto the edge 63 and lodges therein until the loading arms are rotated. The function of the arcuate perimeter 62 of the quadrant is to prevent additional blocks from rolling off the chains when the loading arms are revolved 90° to the dot-and-dash position shown in Fig. 2. Substantially perpendicular to the inwardly curved edge 63 is a narrow, elongated bridge 64 having a straight locating surface 66 which is a chord parallel to a diameter through the center of the shaft 46. The function of the locating surface 66 is to rest upon horizontal transverse beam 67 which supports the loading arms when they are in discharge position. The beams 67 are part of the bed of the carriage of the debarking apparatus (not shown). The opposite or support surface 68 of bridge arm 64 is slanted so that peeler blocks roll down the bridge arm by gravity. The length of bridging arm 64 is less than sufficient to bridge the gap over to transverse beam 69 on the entering edge of the cradle 71 by about twelve inches. The gap between the outer end of arm 64 and beam 69 allows the rolling blocks to straighten parallel to beam 69 and further functions to stop blocks tending to roll backwards out of the cradle and to provide space for bark which has been scraped off to fall into a pit below the level of the loader.

The gap is insufficient to interfere with rolling of the large diameter blocks employed because of the momentum they attain during pivotal movement of the loading arms. If a block sticks in the gap it can be dislodged by upward movement of arms 64 which rolls the block over the beam 69.

It will be seen that hydraulic cylinder 48 controls movement of the loading arms 43 from the full line receiving position shown in Fig. 2 to the dot-and-dash line discharge position shown in Fig. 2. The peeler blocks 36 are received in concavity 63 and as the loading arms revolve through 90° the blocks roll along the slanted surface 68 toward the cradle 71.

*Cradle and elevating mechanism*

The cradle 71 receives the peeler blocks 36 discharged from the loading arms 43 and elevates them to the proper height for the block-revolving chucks. Accordingly, the cradle is a heavy, wide, structure reinforced for the duty required and rests on transverse beams 72 on either side when in lowered position. At each end of the cradle is a cross member 73 and the cross members are connected by transverse beams 69 which knit the cross members 73 and the transverse members 69 into a rigid structure. Spaced inwardly of the cross members 73 is a pair of cradle stop arms 74 on which the peeler blocks rest. The top edge 76 of the entering end of the cradle stop arms is approximately at the level of the outer end of slanting surface 68 of loading arms 43 when in the dot-and-dash position of Fig. 2, and beyond the entering end of the cradle stops the top edge is cut away to provide a concavity 77. Beyond the concavity 77 is an elevated portion or stop 78 considerably above the level of the entering edge 76. Thus, the peeler blocks as they roll onto the cradle stop arms are restrained by the stops 78 and roll back into the depressed cavity 77 where they settle.

The cross members 73, the outer transverse beams 69 and transverse intermediate members 79 which connect each arm 74 with the adjacent cross member 73 and the cradle stop arms 74 form a rigid platform. The rigid platform of the cradle 71 is connected to longitudinal, vertical end plates 81 in non-rigid fashion as hereinafter appears.

On the entering side of the cradle platform adjacent the entering edge thereof are two rods 82 which extend outwardly from the cradle arms 74 and through holes 83 in cross-members 73 and project through holes 80 in end plates 81. On the opposite side of the cradle platform is a pair of pins 84 fixed to beams 69 and transverse members 73. The pins 84 pass through enlarged holes 86 in end plates 81. Holes 86 are approximately one-quarter inch larger than pins 84 and holes 80 are approximately the same amount greater than rods 82.

Rods 82 and pins 84 project beyond the outside surfaces of plates 81. It will thus be seen that the cradle platform may rock about rods 82 and pins 84 within the limits of the oversize holes 80 and 86 in which they fit.

The non-rigid relationship allows one end of the platform of the cradle 71 to be lowered to a different elevation than the opposite end, permitting a downward tilt of one end of the cradle platform as the blocks are released from the chucks which revolve the same.

Mounted on that beam 72 at the exit side of the cradle and located adjacent the cradle end plates are hollow, square vertical posts 87. Within each post is a vertical hydraulic cylinder 88 or 89 connected by means of clevis 90 and clevis pin 91 to hanger 92 on an end cap 93 at the top of the post 87. The lower end of a piston rod 94 of cylinder 88 or 89 is provided with a clevis 96 which is connected by pin 97 to the upper edge of upwardly extending projection 98 of end plate 81 which extends within the post 87 through vertical slot 99 in the side of the post facing cradle 71, the end plates normally resting on the beam 72 at the exit side of the cradle. As the pistons in the hydraulic cylinders 88 and 89 are projected and retracted, cradle end plates 81 are raised and lowered. To facilitate the raising and lowering movements, a pair of rollers 101 is rotatably mounted on opposite sides of each end plate 81 adjacent the bottom edge thereof so as to roll against the outside of the post 87 and another pair of rollers 102 is rotatably mounted on each projection 98 adjacent the upper part thereof inside the post 87 and bears against the inner surface of the post.

Hydraulic cylinders 88 and 89 are controlled by valves 22 and 24 by means of conduits 103 to 106, inclusive, so that each end of the cradle 71 can be raised and lowered independently of the other within practical limits and so that blocks which are of different diameters at their opposite ends can be accommodated.

*Block revolving mechanism*

Mounted on pedestals 111 by means of pillow blocks 112 at opposite sides of the machine are a pair of spindles 113 and 114, the former being a live spindle and the latter a dead spindle, each provided with a conventional chuck 116 and 117, respectively to engage an end of the block 36. To facilitate major adjustment for different sizes of blocks, spindle 113 is hollow and interiorly threaded onto screw 118 which may be turned in or out to move chuck 116 in or out, the turning movement being accomplished by an electric motor (not shown) which turns sprocket 115 and nut 120 on screw 118. Spindle 113 is driven through a pulley 119 keyed thereto. When the block is properly elevated by cylinders 88 and 89, valve 25 is used to control flow of fluid through conduits 121 and 122 to cylinder 123 which moves chuck 117 inward and clamps the block 36 between the two chucks 116 and 117. Spindle 113 is then caused to revolve which then turns the block. After the block is suitably chucked, the cradle 71 is lowered, and remains lowered during the debarking operation. By an appropriate tool (not shown) the bark is stripped from the block.

After the debarking operation is completed, the cradle 71 is raised so that the block 36 is received thereon and chuck 117 is withdrawn. At this point the non-rigid connection of the cradle platform to the end plates 81 permits the end of the block opposite chuck 116 to be lowered first by operating only the cylinder 89. The endwise tilting of the platform permits the block 36 to slide or tilt out of engagement with chuck 116 and thus prevents chuck 116 from scoring or otherwise damaging the end of the block when the entire cradle is subsequently lowered. After the block slides out of engagement with the chuck 116 both ends of the cradle are lowered until the cradle reaches the position shown in Fig. 2 and rests on beams 72.

*Discharge mechanism*

Below the level of the platform of cradle 71 is a transverse shaft 126 suitably supported at either end in pillow blocks 127. Keyed to shaft 126 is a pair of kicker arms 128 having inwardly turned points 129 at their outer extremities. An arm 131 is fixed to shaft 126 and the outer end thereof is connected to a clevis 132 by a clevis pin 133 which is fastened to the outer end of piston rod 134 in hydraulic cylinder 136, which cylinder is pivotally mounted to a hanger 138 secured to the beam 172 on the exit side of the cradle, the beam 172 being supported by a pedestal 137. Upon completion of the debarking operation, the cradle 71 is lowered to the position shown in Fig. 2 and the kicker arms 128 are rotated from the position shown in solid lines in Fig. 2 to the position shown in dot-and-dash lines which rolls the block off the cradle platform and toward the right as shown in Fig. 2, points 129 functioning to keep the block from rolling back. Cylinder 136 is controlled from valve 23 by conduits 141 and 142. Suitable conveyors (not shown) receive the debarked block.

To accomplish horizontal adjustment of the block prior to chucking for turning, kicker arms 128 are made long enough to contact the block and by their pivotal movement cause the block to move along cradle arms 74

What is claimed is:

1. A debarking loading and unloading mechanism wherein peeler blocks are transferred from a receiving station, debarked, and then discharged comprising, loading arms, a cradle, and a discharge kicker, said loading arms comprising means for receiving a block from the receiving station and transferring a block to said cradle, said cradle comprising a platform and means for altering the elevation of said platform for the purpose of positioning a block for a debarking operation, and said discharge kicker comprising means for rolling a block off said cradle platform.

2. Mechanism according to claim 1, in which said receiving station is located remote from said cradle and in which said loading arms are located proximate said receiving station and include an elongated bridging member to span the distance between said receiving station and said cradle platform.

3. Mechanism according to claim 2, in which the upper surface of said bridging member is inclined when in bridging position to impart a rolling action to a peeler block.

4. Mechanism according to claim 1, in which said receiving station is located remote from said cradle and said loading arms are pivotally mounted on an axis proximate said receiving station, each of said loading arms comprising a short arm and an elongated bridging member extending substantially perpendicular to the adjacent edge of said short arm, said bridging member spanning the distance between said receiving station and said cradle platform when in one position, and means for pivotally moving said loading arms.

5. Mechanism according to claim 4, in which said short arm includes means forming a peripheral arcuate edge extending substantially 90° behind said short arm, said arcuate edge serving to restrain movement of additional blocks from said receiving station when said loading arms are transferring one block to said cradle platform.

6. Mechanism according to claim 5, in which the edge of said short arm adjacent said bridging member is curved inwardly to receive a peeler block and secure the same against unintentional dislodgement.

7. Mechanism according to claim 1, in which said cradle platform has an opening centrally thereof; and in which said discharge kicker comprises a shaft below one edge of said opening, and at least two arms mounted on said shaft and positioned upon turning movement of said shaft to extend up through said opening and thereby roll a block off said cradle platform.

8. Mechanism according to claim 1, in which said cradle platform comprises a rectangular frame normally substantially horizontal; and in which said platform elevating means comprises a pair of end plates located at opposite ends of said frame, means connecting said frame and end plates, a pair of lifting means connected to said end plates, and means for holding said end plates against tilting movement while either raising or lowering said cradle platform.

9. Mechanism according to claim 8, in which there is provided a pair of vertically slotted hollow posts, said pair of lifting means being mounted in said pair of posts, vertical edges of said pair of end plates extending into the slots of said pair of posts; and said means for holding said end plates against tilting movement comprising a set of first rollers mounted on said end plates inside said posts and bearing against the inside walls of said posts, and a set of second rollers mounted on said end plates outside said posts and bearing against the outside walls of said posts, said sets of rollers being at different elevations.

10. Mechanism according to claim 8, in which said pair of lifting means includes individually operable means that, when sequentially operated, enable said pair of lifting means to tilt said cradle platform.

11. Mechanism according to claim 10, in which said means for connecting said frame and end plates comprises four pins projecting from opposite corners of said frame, two said pins extending into holes in one of said plates and the other two said pins extending into holes in the other of said plates, said holes being larger than the pins received therein to facilitate said tilting of said cradle platform.

12. Mechanism according to claim 8, which further comprises stops mounted on said cradle platform and extending generally horizontally and transversely to the direction of movement of a block, said stops being higher at the end opposite said receiving station.

13. Mechanism according to claim 12, in which the top edge of said stops is curved downwardly midway of the length thereof.

14. Mechanism according to claim 1, in which said loading arms are pivotally mounted, a first hydraulic means being provided for pivoting said loading arms; in which said platform-elevating means includes second and third hydraulic means; and in which said discharge kicker is pivotally mounted, a fourth hydraulic means being provided for pivoting said discharge kicker, a valve being provided for each said hydraulic means, and a common hydraulic pump being provided for all of said hydraulic means and being operable upon suitable actuation of the proper valve to move any of said hydraulic means.

15. Mechanism according to claim 14 in which all of said valves are located in a single bank.

16. A cradle for a debarking machine comprising a rectangular, substantially horizontal, and vertically movable frame, a first vertical, hollow post rectangular in horizontal cross section and vertically slotted and positioned near one corner of said frame, a second post similar to said first post and positioned near another and adjacent corner of said frame, a pair of vertical end plates connected to opposite ends of said frame, said end plates having vertical edges at said corners that extend through the slots in said posts, a first hydraulic cylinder mounted in said first post and having its piston rod connected to one of said end plates, a second hydraulic cylinder mounted in said second post and having its piston rod connected to the other of said end plates, and means for maintaining the vertical edges of said end plates against tilting movement.

17. A cradle according to claim 16, in which said last mentioned means comprises a first set of rollers mounted on said end plates at the top edges thereof inside said posts and bearing against the inner walls thereof and a second set of rollers mounted on said end plates at the bottom thereof outside said posts and bearing against the outer walls thereof.

18. A cradle according to claim 16, in which said end plates are connected to said frame by means of four pins carried by said frame, two of said pins extending into holes in each of said plates, said pins being of lesser diameter than the holes in which said pins fit to permit tilting of said frame upon differential movement of said piston rods.

19. A cradle according to claim 16, which further comprises a pair of cradle stops on said frame extending generally horizontal, the top edges of said stops being elevated at one end and curved downwardly midway of their length.

20. A cradle according to claim 19, in which said frame is formed with a central aperture, and in which there is further provided a shaft below said frame, and kicker arms rotatably mounted on said shaft to roll a peeler block off said frame.

References Cited in the file of this patent

UNITED STATES PATENTS

| | | |
|---|---|---|
| 1,608,876 | Davis et al. | Nov. 30, 1926 |
| 1,738,067 | Harper | Dec. 3, 1929 |
| 2,352,885 | Bukowsky | July 4, 1944 |
| 2,453,947 | Swift | Nov. 16, 1948 |